United States Patent [19]

Moore et al.

[11] Patent Number: 5,284,290
[45] Date of Patent: Feb. 8, 1994

[54] FUSION WELDING WITH SELF-GENERATED FILLER METAL

[75] Inventors: Thomas J. Moore, Berea; Joseph M. Kalinowski, Strongsville, both of Ohio

[73] Assignee: The United States of America as represented by the Adminstrator of the National Aeronautics and Space Administration, Washington, D.C.

[21] Appl. No.: 63,222

[22] Filed: Apr. 23, 1993

[51] Int. Cl.⁵ ............................................. B23K 31/02
[52] U.S. Cl. ..................... 228/211; 228/203; 228/232; 428/610; 148/512
[58] Field of Search ............ 228/211, 203, 195, 232; 428/610; 148/512, 535

[56] References Cited

U.S. PATENT DOCUMENTS

| | | | |
|---|---|---|---|
| 3,180,022 | 4/1965 | Briggs et al. | 29/487 |
| 3,199,189 | 8/1965 | La Plante | 228/211 |
| 3,370,343 | 2/1968 | Martin | 29/494 |
| 3,614,378 | 10/1971 | Goodell et al. | 219/137 |
| 3,744,120 | 7/1973 | Burgess | 29/494 |
| 4,847,044 | 7/1989 | Ghosh | 419/8 |
| 4,948,457 | 8/1990 | Cooper | 156/629 |
| 4,988,036 | 1/1991 | Kemble et al. | 228/217 |

FOREIGN PATENT DOCUMENTS

280275A1 7/1990 Fed. Rep. of Germany ...... 228/203

Primary Examiner—Paula A. Bradley
Assistant Examiner—Jeffrey T. Knapp
Attorney, Agent, or Firm—Gene E. Shook; Guy M. Miller; James A. Mackin

[57] ABSTRACT

NiAl is preheated to a temperature between 1530° C. and 1638° C. causing some of the aluminum to evaporate along the faying surfaces thereby forming a glazed layer of nickel rich self-generated filler metal. The glazed faying surfaces are placed in contact, heated to 1530° C. to 1570° C., and pressed together to form a fusion weld.

15 Claims, 5 Drawing Sheets

FUSION WELDING WITH SELF-GENERATED FILLER METAL

ORIGIN OF THE INVENTION

The invention described herein was made by an employee of the U.S. Government together with a contractor employee performing work under a NASA contract and is subject to the provisions of Section 305 of the National Aeronautics and Space Act of 1958, Public Law 85-568 (72 Statute 435; 42 USC 2457).

TECHNICAL FIELD

This invention is concerned with the welding of materials. The invention is particularly directed to fusion welding of brittle intermetallic base materials.

Monolithic intermetallic materials containing aluminum offer new opportunities for the development of low density, oxidation resistant alloys for high performance jet engine applications. For example, NiAl is currently a candidate material for use as a cast high-pressure turbine blade. Composites, consisting of an intermetallic matrix reinforced with ceramic fibers, are also in the development stage for aerospace applications. The use of these materials in structural applications will depend on the availability of suitable welding processes.

Attempts to join NiAl using conventional electron beam welding procedures have been unsuccessful. Cracking occurs as a result of the brittleness of the intermetallic base material. This cracking problem can be avoided if welding is accomplished without melting the base material.

It is, therefore, an object of the present invention to provide a unique welding process which is suitable for the fabrication of structural parts in NiAl which is essentially unweldable by other methods.

Another object of the invention is to utilize self-generated filler metal to make a joint without the addition of any foreign elements.

A further object of the invention is to produce a welded joint which is undetectable by metallography and which matches base material properties.

BACKGROUND ART

U.S. Pat. No. 4,988,036 to Kemble et al relates to aluminum alloy brazing material consisting of aluminum, silicon and magnesium. Burgess et al Pat. No. 3,744,120 is concerned with a method of direct bonding of metals by means of a metal-gas eutectic.

Ghosh Pat. No. 4,847,044 is concerned with a metal aluminide composite formed by first fabricating an alloy having a softer metal in the surface layer. Cooper et al Pat. No. 4,948,457 describes a process for the diffusion bonding of an aluminum alloy.

DISCLOSURE OF THE INVENTION

The present invention is a two step process. In the first step, a simple means is used to produce a thin, uniform glaze of self-generated filler metal on the faying surfaces. This is accomplished by heating NiAl members in vacuum in order to evaporate Al from the faying surface and thereby form a lower melting point alloy. The resultant thin glaze of filler material differs from the substrate only in that it is a Ni-rich variation of NiAl. The filler metal glaze contains no foreign elements.

Welding is accomplished in the second step when the glazed faying surfaces are placed in contact with a dead weight load, and heated in vacuum to the melting point of the filler metal. Postheating may be applied to promote chemical homogenization at the joint.

This two-step joining procedure is a fusion welding process. Filler metal, which is formed on both faying surfaces in the first step, is in the liquid state during the second step, when coalescence occurs. This method has some portions common with diffusion brazing. In both processes, the base metal is not melted during coalescence, and interdiffusion between filler metal and base metal occurs to the extent that the joint properties approach those of the base metal.

BRIEF DESCRIPTION OF THE DRAWINGS

The objects, advantages and novel features of the invention will be more fully apparent from the following detailed description when read in connection with the accompanying drawings wherein like numerals are used throughout to identify like parts.

DESCRIPTION OF THE PREFERRED EMBODIMENTS

Figure 1:
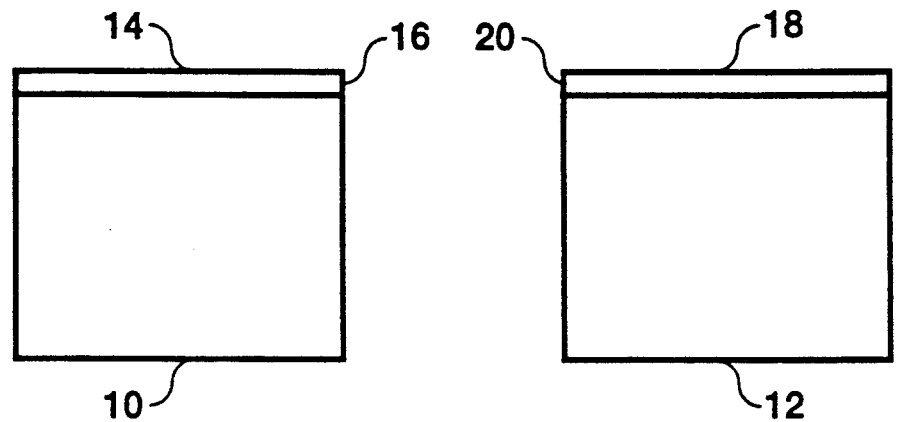
FIG. 1 is a side elevation view showing two structural members which are to be welded in accordance with the present invention.

Referring now to the drawings there is shown in FIG. 1 a pair of members 10 and 12 of an intermetallic base material which are to be welded in accordance with the present invention. The member 10 has a faying surface 14 which is glazed with self-generated filler metal 16. The member 12 has a faying surface 18 that is similarly glazed with a self-generated filler metal 20.

Figure 2:
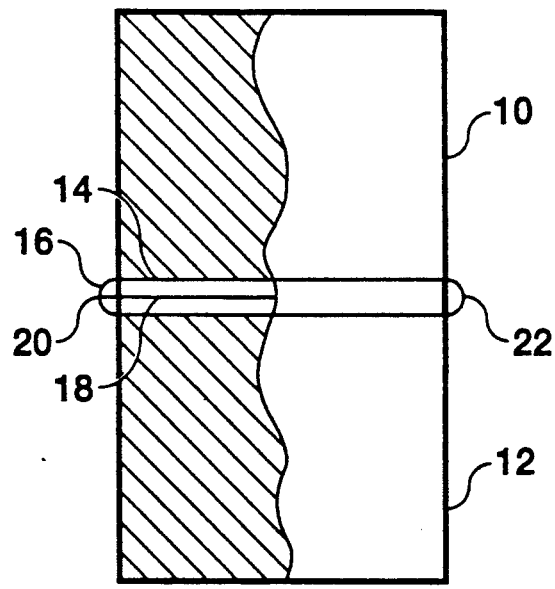
FIG. 2 is an elevation view partially in section, showing members assembled in preparation for welding in accordance with the invention.
Figure 3:
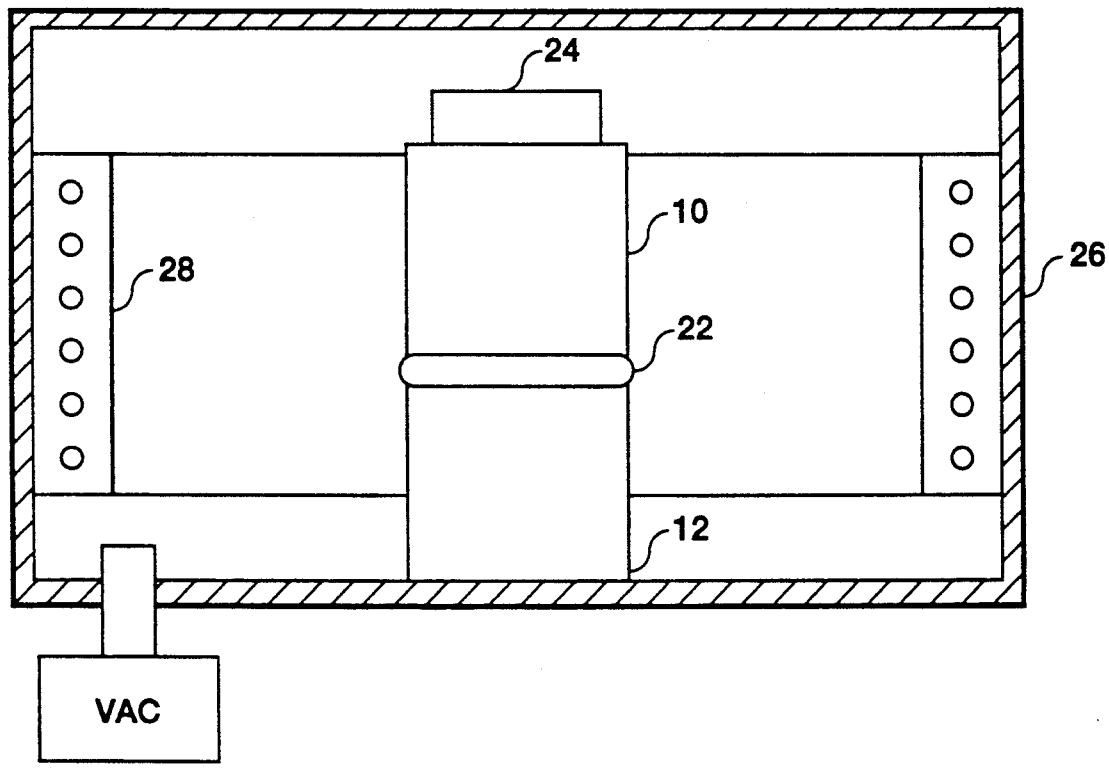
FIG. 3 is a side elevation view of the assembled members of FIGS. 1 and 2 in a vacuum chamber of a resistance heated furnace.

FIG. 2 shows a welded joint 22 in partial section wherein the surfaces 14 and 18 are placed in contact to form a butt joint. FIG. 3 shows the members 10 and 12 with a dead weight 24 and the weld joint 22 in a vacuum chamber 26 which encloses a resistance heater 28. As the members 10 and 12 are heated by radiation from the resistance heater 28, the dead weight 24 applies a compressive force to the faying surfaces 14 and 18.

Figure 4:
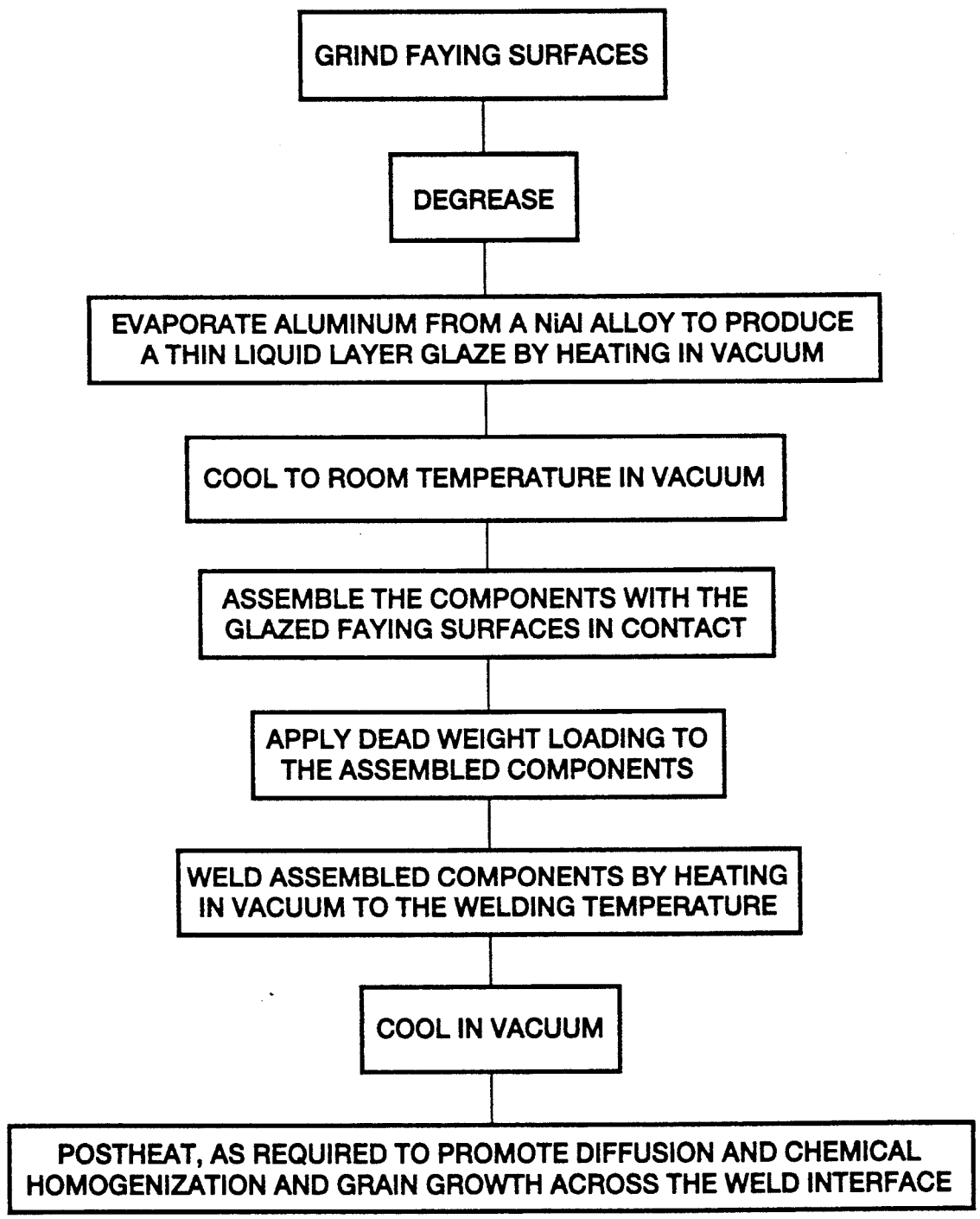
FIG. 4 is a flow sheet illustrating diagrammatically the preferred process for fusion welding in accordance with the present invention.

Referring now to FIG. 4 there is illustrated the procedure used to produce self-generated filler metal 16 and 20 on the faying surfaces 14 and 18, respectively, of NiAl structural members 10 and 12. FIG. 4 further shows the subsequent steps required to weld the members 10 and 12. More particularly, the initial step in the preparation of the faying surfaces comprises grinding and degreasing. Next, the members 10 and 12 are positioned, as shown in FIG. 1, for elevated temperature exposure in a vacuum. This can be accomplished in the vacuum chamber 26 which contains the resistance heater 28 shown in FIG. Heating the NiAl material in the vacuum chamber 26 produces the thin glaze of self-generated filler metal 16 and 20 on the faying surfaces 14 and 18, respectively, as shown in FIG. 1. This results from the preferential evaporation of aluminum, which has a much higher vapor pressure than nickel.

Figure 5:
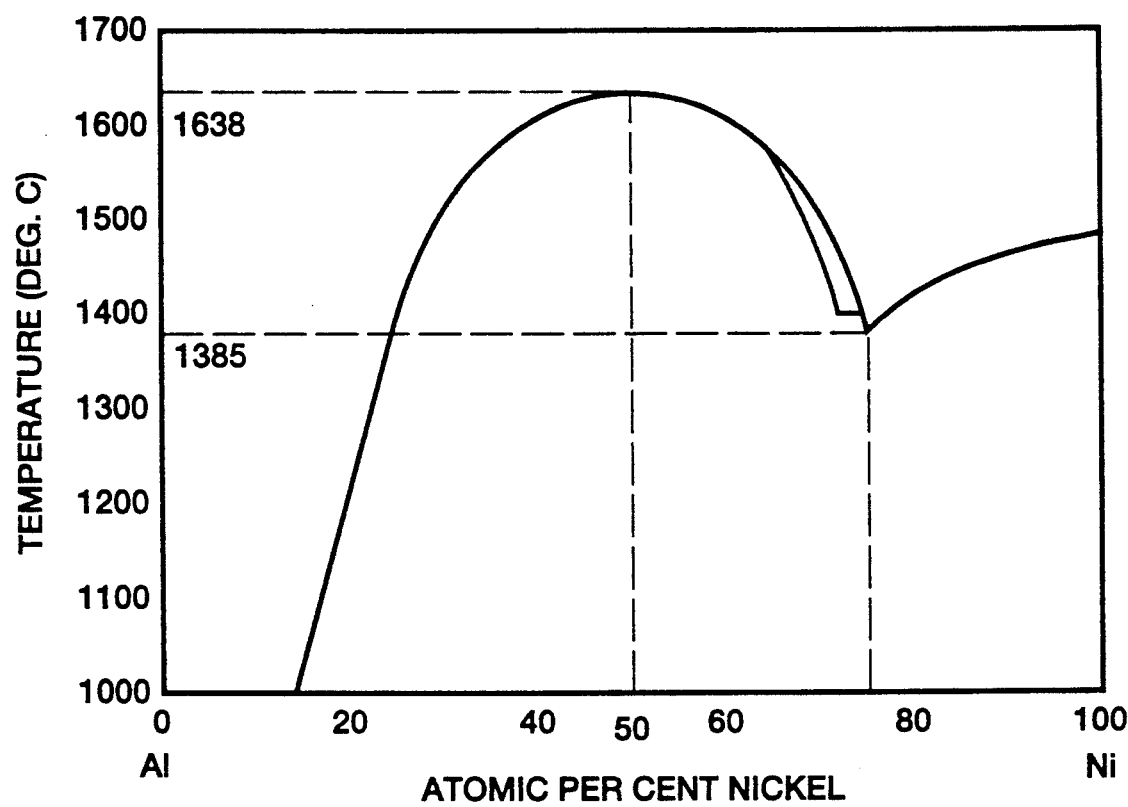
FIG. 5 is a Ni-Al phase diagram.

Referring to FIG. 5, the melting point of a nickel rich NiAl surface layer is much lower than the 1638° C. melting point of a 50/50 atomic % Ni-Al alloy. By way of example, self-generated filler metal has been successfully produced in a vacuum chamber at a pressure of $6.7 \times 10^{-3}$ Pa or better in 1-5 minutes at temperatures in the range of about 1530° C. to about 1570° C.

Referring again to FIG. 4, after the glazed members 10 and 12 are cooled they are assembled to form a butt joint for the welding operation. The glazed faying surfaces 14 and 18 are brought into contact, as shown in FIG. 2. The assembled components are then placed in the vacuum chamber 26 with the dead weight 24 providing a load as shown in FIG. 3. The resistance heater 28 heats the members 10 and 12 to the melting temperature of the filler metal 16 and 20.

The welded assembly is then cooled in the vacuum chamber 26. By way of example welding was successfully accomplished at 1530° C. for fifteen minutes with a dead weight load of 0.04 MPa. Welding was also successfully accomplished at a temperature of 1570° C. for about two minutes with a dead weight load of 0.01 MPa.

As shown in the flow diagram of FIG. 4, postheating may be applied to promote chemical homogenization and grain growth across the weld interface. By way of example, joints welded in accordance with the present invention have been postheated at 1530° C. for about six hours in argon.

Cast and extruded NiAl bars were fusion welded in accordance with the present invention and the resulting butt welded joints were tested. The processing of these welds are shown in Table 1.

TABLE 1

Processing To Obtain Welded Butt Joints
Pressure of $6.7 \times 10^{-3}$ Pa Vacuum Unless Noted

| Sample | Glaze Temp °C. | Glaze Time Min | Weld Temp °C. | Weld Pressure MPa | Weld Time Min | Postheat in Argon Temp °C. | Postheat in Argon Time Hrs |
|---|---|---|---|---|---|---|---|
| A | 1570 | 1 | 1570 | 0.01 | 2 | None | |
| B | 1570 | 1 | 1570 | 0.01 | 2 | None | |
| C | 1570 | 1 | 1570 | 0.01 | 2 | None | |
| D | 1530 | 3 | 1530 | 0.04 | 15 | None | |
| E | 1530 | 3 | 1530 | 0.04 | 15 | None | |
| F | 1530 | 3 | 1530 | 0.04 | 15 | None | |
| G | 1530 | 3 | 1530 | 0.04 | 15 | 1530 | 6 |
| H | 1530 | 3 | 1530 | 0.04 | 15 | 1530 | 6 |
| I | 1530 | 3 | 1530 | 0.04 | 15 | 1530 | 6 |

The fusion welded bars are set forth in Table 1 were tested. The tensile properties of the respective samples of Table 1 are shown in Table II.

TABLE II

Tensile Properties of Welded Butt Joints

| Sample | Test Temp °C. | Yield Strength MPa | Tensile Strength MPa | % Elongation | Fracture Location |
|---|---|---|---|---|---|
| A | 27 | — | 90 | 0 | Base Metal |
| B | 27 | — | 30 | 0 | Base Metal |
| C | 427 | 81 | 158 | 5.3 | Base Metal |
| D | | Fractured During Machining | | | At the Joint |
| E | 27 | — | 19 | 0 | Base Metal |
| F | 27 | — | 81 | 0 | At the Joint |

TABLE II-continued

Tensile Properties of Welded Butt Joints

| Sample | Test Temp °C. | Yield Strength MPa | Tensile Strength MPa | % Elongation | Fracture Location |
|---|---|---|---|---|---|
| G | | Fractured During Machining | | | At the Joint |
| H | 27 | — | 151 | 0 | Base Metal |
| I | 27 | 191 | 219 | 0.55 | Base Metal |

A study of the tensile test data in Table II shows that all three specimens which were glazed and welded at 1570° C. failed in the base material in the as-welded condition. This illustrates that the joints in samples A, B and C were at least as strong as the base metal.

As welded samples D, E, and F were glazed and welded at 1530° C. Each of these welds failed in a different manner. Sample D failed at the joint during machining. Sample E failed in the base metal at relatively low stress, and sample F failed at the joint during tensile testing. There was no obvious reason for the low base metal strength in sample E.

Figure 6:
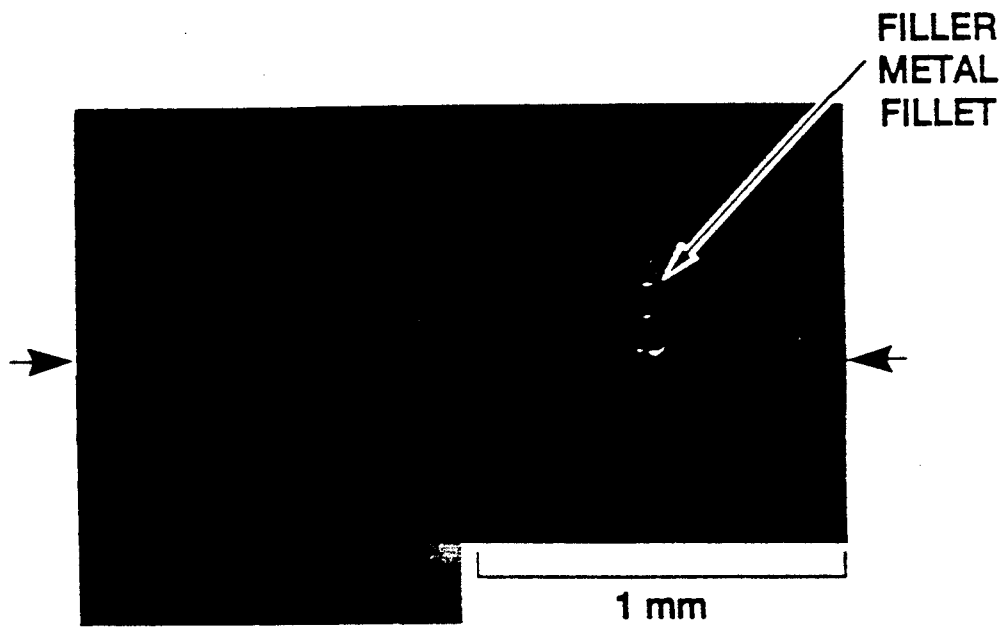
FIG. 6 is a photomicrograph of fusion welded joints made in accordance with the present invention.

The microstructure of a companion joint glazed and brazed at 1530° C. was sound, as illustrated in the photomicrograph shown in FIG. 6. A visual characteristic of all the welded joints was that the external fillet and the thin band of filler metal at the weld were of a copper color. This rather unique effect demonstrates a well known characteristic of NiAl material. A change in composition results in a color change.

Referring again to Table II, specimens G, H and I were glazed and welded at 1530° C. and then postheated. Specimens H and I failed in the base metal. Sample G failed at the joint during machining.

Figure 7:
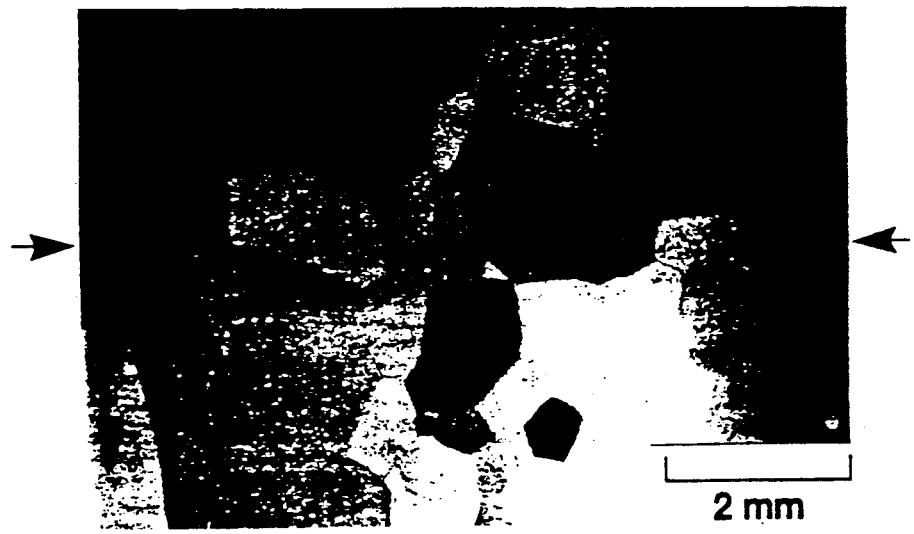
FIG. 7 is a photomicrograph of a fusion welded joint made in accordance with the present invention.

FIG. 7 shows the microstructure of a companion specimen which exhibits extensive grain growth across the weld interface. Post heating changed the color of this joint from an as welded copper color to a pink color. This color change indicates that chemical homogenization has occurred due to the diffusion of Al atoms into the Ni-rich region at the joint.

While the preferred embodiment of the invention has been shown and described, it will be appreciated that various procedural modifications may be made in the disclosed method without departing from the spirit of the invention and the scope of subjoined claims. By way of example, with proper fixturing, the glazing and welding steps could be accomplished in a single vacuum furnace run. In this variation, glazed faying surfaces could be brought into contact while the filler metal is molten to produce the weld.

In still another embodiment, hot isostatic pressing or uniaxial hot pressing could be used to produce welded joints which are first sealed in vacuum at the periphery with a self-generated filler metal fillet, as shown in FIG. 6. In this example, the faying surfaces may or may not be glazed prior to making the peripheral seal.

We claim:

1. A method of joining members of a metal alloy containing at least two alloying elements along faying surfaces without the addition of other material, filler metal, or brazing material comprising
   removing one of said alloying elements from said faying surfaces thereby lowering the solidus and the liquidus temperatures of the alloy at said faying surfaces whereby a glazed layer of the remaining alloying elements is produced,
   placing said glazed surfaces in contact in a chamber, applying a pressure to said contacting surfaces, and heating said contacting surfaces in said chamber while applying said pressure thereby fusion welding the same.

2. A method of joining members as claimed in claim 1 wherein the members are an intermetallic base metal.

3. A method of joining members as claimed in claim 2 wherein the members contain nickel and aluminum in a ratio such that the alloy-has a melting point of about 1638° C.

4. A method of joining members as claimed in claim 3 wherein aluminum is removed from the faying surfaces to lower the solidus and liquidus temperatures.

5. A method of joining members as claimed in claim 4 wherein the members are heated to between about 1530° C. and about 1570° C. to remove the aluminum at the faying surfaces.

6. A method of joining members as claimed in claim 5 wherein the members are heated in a vacuum environment.

7. A method of joining members as claimed in claim 6 wherein the members are heated in a vacuum environment between about one minute and about three minutes.

8. A method of joining members as claimed in claim 7 wherein the faying surfaces are placed in contact and fusion welded by heating to a temperature of about 1530° C.

9. A method of joining members as claimed in claim 8 wherein the members are maintained at 1530° C. for about 15 minutes.

10. A method of joining intermetallic base metal members containing nickel and aluminum in a ratio such that said metal members have a melting point of about 1638° C. along faying surfaces comprising placing the members in a vacuum environment with said surfaces in substantial juxtaposition, heating said members to a temperature of at least 1530° C. but below 1638° C., maintaining said members at 1530° C. for about one minute to about three minutes whereby aluminum evaporates along said faying surfaces thereby forming a glazed layer of nickel rich self-generated filler metal having a melting point below 1638° C., placing said glazed faying surfaces in contact, heating said contacting faying surfaces to about 1530° C. to about 1570° C., applying a pressure to said faying surface, and maintaining said contacting faying surfaces at 1530° C. to about 1570° C. for about two minutes to about 15 minutes thereby fusion welding the contacting surfaces.

11. A method of fusion welding a pair of members together in a vacuum furnace comprising the steps of providing substantially flat faying surfaces on said members, forming a glaze of self-generated filler metal on said faying surfaces by heating to an elevated temperature of 1530° C. to 1570° C. for one to three minutes and cooling to room temperature in vacuum, assembling said members with the glazed surfaces in contact to form a butt joint, applying pressure up to approximately 0.04 MPa to said faying surfaces by dead weight loading, and fusion welding said faying surfaces by heating the assembly to an elevated temperature of 1530° C. to 1570° C. and holding for about one to fifteen minutes while maintaining said pressure.

12. A method of fusion welding as claimed in claim 11 wherein the faying surfaces are formed by grinding.

13. A method of fusion welding as claimed in claim 12 including the step of providing a glaze of self-generated filler metal for the subsequent fusion welding operation.

14. A method of fusion welding as claimed in claim 11 including the step of postheating for chemical homogenization in the vicinity of the joint through diffusion.

15. A method of fusion welding as claimed in claim 14 including postheating at about 1530° C. for about six hours in argon.

* * * * *